United States Patent [19]

Hirano et al.

[11] Patent Number: 4,700,913
[45] Date of Patent: Oct. 20, 1987

[54] CABLE HOLDER FOR USE IN A VEHICLE BODY

[75] Inventors: Seiji Hirano; Youji Sato, both of Hiroshima, Japan

[73] Assignees: Mazda Motor Corporation, Hiroshima; Nifco Inc., Yokohama, both of Japan

[21] Appl. No.: 784,544

[22] Filed: Oct. 4, 1985

[30] Foreign Application Priority Data

Oct. 11, 1984 [JP] Japan ............................ 59-152253[U]

[51] Int. Cl.[4] .............................................. F16L 3/08
[52] U.S. Cl. .................................... 248/73; 248/74.3; 24/543
[58] Field of Search ........................ 248/73, 68.1, 74.1, 248/44.3, 74.2; 24/543, 326, 453

[56] References Cited

U.S. PATENT DOCUMENTS

| | | | |
|---|---|---|---|
| 3,074,675 | 1/1963 | Brown | 248/74.3 |
| 3,126,183 | 3/1964 | Hopkins | 248/73 |
| 3,126,184 | 3/1964 | Kropp | 248/73 |
| 3,126,185 | 3/1964 | Christman | 248/73 X |
| 3,163,712 | 12/1964 | Cochran | 248/74.3 X |
| 3,421,187 | 1/1969 | Ryder | 248/74.3 X |
| 3,515,363 | 6/1970 | Fisher | 248/74.3 X |
| 3,980,263 | 9/1976 | Okuda | 248/73 |
| 3,991,960 | 11/1976 | Tanaka | 248/73 X |
| 4,564,163 | 1/1986 | Barnett | 248/74.3 X |

Primary Examiner—Ramon S. Britts
Assistant Examiner—Sarah A. Lechok Eley
Attorney, Agent, or Firm—Trexler, Bushnell, Giangiorgi & Blackstone, Ltd.

[57] ABSTRACT

A cable holder comprises a U-shaped retaining body having a retaining groove for receiving cables, a head extending from the top of the retaining body and adapted to be inserted in a mounting hole formed in a panel, and locking means united via a hinge to the lower end of the retaining portion to close a lower opening of the retaining groove, whereby cables are fitted in the retaining groove, and then the locking means is fitted on the retaining portion to firmly hold the cables.

5 Claims, 7 Drawing Figures

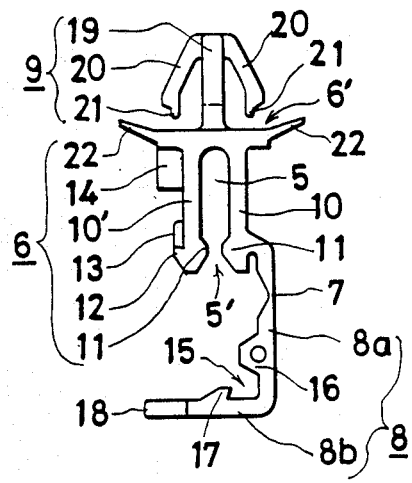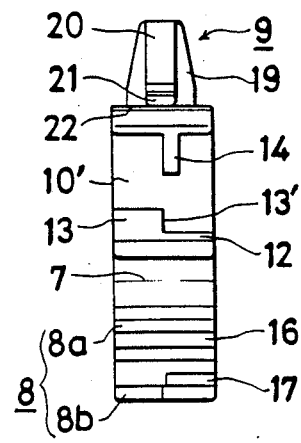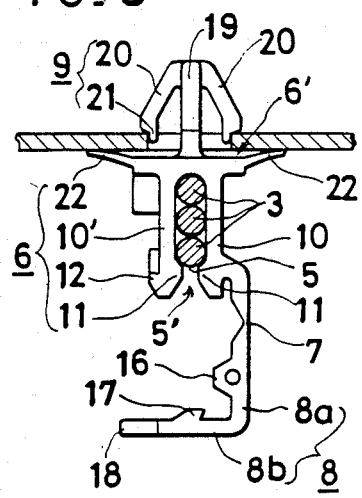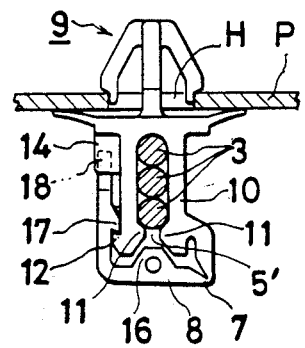

CABLE HOLDER FOR USE IN A VEHICLE BODY

FIELD OF THE INVENTION AND RELATED ART STATEMENT

This invention relates to a cable holder for laying cables of an electric system or the like along an automobile body panel, for instance.

As a prior art cable holder of this type, there has been known an anchor type clip comprising a leg portion to be secured to the automobile body panel and an arm portion having a substantially U-shaped retaining groove for retaining cables or the like. With this clip wobbling or detachment of the cables or the like retained by the arm portion is apt to occur due to vibration and shocks produced during running of the automobile. Accordingly, there have been proposed cable holders which can reliably retain cables or the like, in Japanese Utility Model Public Disclosures Nos. SHO 53-10063, SHO 55-120817 and SHO 58-56271, for instance.

When some of these prior art cable holders are used for retaining cables in an automobile, however, they require very cumbersome mounting operations and are inferior in the operability as regards the work of attaching the holders to the automobile body panel, even though reliable cable retaining force can be ensured, while others can provide only insufficient cable retaining force thereby permitting cables to be readily detached due to vibration or shocks even though they can be easily handled and mounted. If cables are detached from the cable retainer, they will hang down and touch the ground during running of the automobile. In such a case, lamps powered by the cables, e.g. the lamp illuminating the license plate, will flicker and/or go out.

OBJECT AND SUMMARY OF THE INVENTION

An object of the invention is to provide a cable holder, which can be easily mounted on an automobile body panel to simply and reliably retain cables or the like.

To attain the above object of the invention, there is provided a cable holer which comprises a U-shaped retaining body having a pair of depending walls defining a retaining groove for retaining cables and provided with inner proturberances projecting into the retaining groove, a head extending upright from the top of the retaining body for being engaged in a mounting hole formed in an automobile body panel, an arm provided via a hinge to the lower end of the retaining body for closing the lower open end of the retaining groove, and locking means provided between the arm and the retaining body for locking the arm at the position to close the lower open end of the retaining groove.

Cables are fitted into the retaining groove through the lower open end thereof to be temporarily retained in the groove by the inner protuberances thereof, and then the lower open end of the groove is closed by the arm, whereby the cables can be reliably held. The operation of installing the cables is very simple.

The above and other objects and features of the invention will become more apparent from the detailed description of the invention with reference to the accompanying drawings.

BRIEF DESCRIPTION OF THE DRAWINGS

FIG. 3 is a front view showing the cable holder;

FIG. 4 is a side view showing the cable holder;

FIG. 5 is a front view showing the cable holder in the state of temporarily retaining cables;

FIG. 6 is a front view showing the cable holder with an arm locked to a retaining portion; and FIG. 7 is a front view showing the cable holder with a cable detached from the retaining groove.

DETAILED DESCRIPTION OF THE PREFERRED EMBODIMENT

Figure 1:
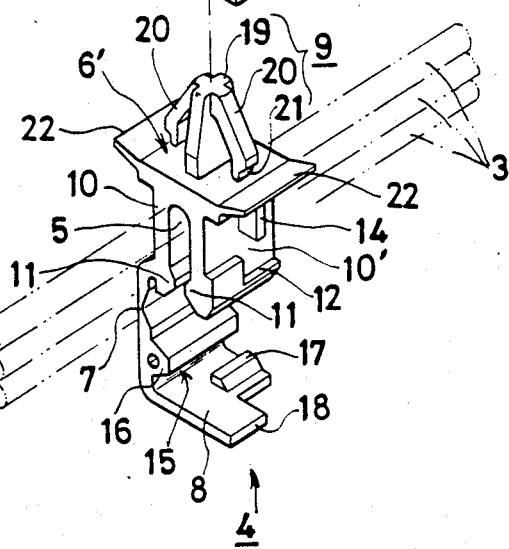
FIG. 1 is a fragmentary exploded perspective view showing an embodiment of the cable holder according to the invention.

Now, the invention will be described in conjunction with an embodiment illustrated in the drawings.

Figure 2:
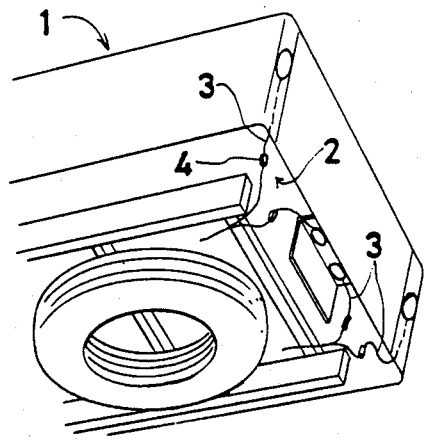
FIG. 2 is a fragmentary perspective view showing the underside of a vehicle body to which the cable retainer is applied.

Referring to FIGS. 1 and 2, as one example, a cable holder 4 according to this invention is attached to the underside (panel P) at the rear of an automobile such as a truck. The cable is adapted to retain one or more cables 3 in a bundle. The cables are generally of the type used in an electrical system of the automobile. Specifically, in FIG. 2, the cables 3 are adapted for supplying electric power to lamps for illuminating a license plate on the truck, and are passed along the underside 2 of the truck 1, for instance.

FIG. 1 is an exploded perspective view showing the cable holder 4. The cable holder 4 is usually a one-piece molding of a plastic material. It is engaged in a mounting hole H formed in the panel P to hold the cables 3 so that the cables 3 are spaced from the underside of the panel P.

The cable holder 4 comprises a retaining portion 6 having wall portions 10 and 10'. A plurality of cables 3 are retained in the U-shaped groove 5. The wall portions 10 and 10' depend vertically and face each other at a predetermined distance from each other, so as to define a U-shaped groove 5 open at the bottom. In this embodiment, the groove 5 has a depth such that about three cables 3 can be received in a row, but this is by no means limitative. The cable holder 4 also has an arm portion 8 united to the lower end of the wall portion 10 via a hinge portion 7 having a reduced thickness. The arm portion 8 is adapted to be upwardly turned about the hinge portion 7 to close the open lower end 5' of the groove 5. The cable holder 4 further has a head 9 extending upright from the top 6' of the retaining portion 6. The head 9 is adapted to be passed through the molding hole H in the panel P by being deformed to be elastically engaged with the upper and lower surfaces of the panel P around the hole H in cooperation with the top 6' of the retaining portion 6.

The lower ends of the wall portions 10 and 10' are provided with inner ridges 11 having a substantially triangular sectional profile projecting inside. The ridges 11 serve to prevent easy detachment of the cables 3 retained in the groove. The arm portion 8 depends from the outer edge of the lower end of the wall portion 10 via the hinge portion 7 having a reduced thickness. The other wall portion 10' is provided on the lower end of its outer surface with a locking step 12, while the arm portion 8 is provided on its free end portion with a pawl 17. The step 12 and the pawl 17 constitute a locking means. In this embodiment, the locking step 12 is provided on one sidewise half of the wall portion 10'. The other half of the wall portion 10' is provided with a raised portion 13, which is adapted to slightly space apart the arm portion 8 from its outer surface. The upper end of the raised portion 13 is at a higher level than the upper end of the locking step 12. On the outer surface of the wall portion 10' is provided a vertically elongate projection 14 in a substantially central upper portion of the wall portion 10'. The side surface 13' of the raised portion 13 and elongate projection 14 serve to prevent twisting of the arm portion 8 that may otherwise be caused when the arm portion is turned and locked.

The arm portion 8 has a substantially L-shaped form having a vertical portion 8a parallel with the wall portion 10 and a horizontal portion 8b extending from the lower end of the vertical portion 8a. On the inner surface of the portion 8a, there is formed a receiving section 15 consisting of a ridge 16 having a trapezoidal sectional profile and capable of entering into the lower opening 5' of the groove 5 to close.

On the one side half of the portion 8b is formed the pawl 17, while on the other side half of the portion 8b is provided a tongue portion 18 which serves as an operating member.

The head 9 may have any shape so long as it can support the retaining portion 6 under the panel P. In this embodiment, the head 9 constitutes an anchor type clip.

In this embodiment, the head 9 has a central portion 19 and a pair of inverted pawl portions 20 extending obliquely downward from the opposite sides of the top of the central portion 19. The free end of each inverted pawl portion 20 has a stepped portion 21 which is engaged with the corresponding edge of the mounting hole H of the panel P. The opposite side edges of the retaining portion 6 are provided with elastic wing portions 22 which come into elastic contact with the underside of the panel P. The elastic wing portions 22 have an effect of reinforcing the anchor retaining force and also permit an increase in the allowance of the panel thickness. However, they may be dispensed with.

To lay cables 3 along the underside of panel P by using the cable holder 4 having the above construction, the cable holder 4 is preliminarily secured to the panel P, and then cables 3 are mounted in the cable holder 4. Alternatively, the cables 3 may be first mounted in the cable holder 4, and the cable holder 4 may then be secured to the panel P. The former manner of mounting will now be described in detail.

To secure the cable retainer 4 to the panel P, the head 9 is thrust into the mounting hole H of the panel P from below. As the head 9 is inserted through the panel P, the pawl portions 20 of the head 9 come to engagement with the edges of the mounting hole H. As the pawl portions 20 subsequently slide along the hole edges, they are elastically flexed. Ultimately, the stepped portions 21 are snap engaged with the hole edges with the outward elastic force of the pawl portions 20. In this way, the cable holder 4 is secured to the panel P with the panel P clamped between the pawl portions 20 and the top of the retaining portion 6.

Subsequently, the cables 3 are inserted into the retaining groove 5 through the lower open end 5' thereof. To insert the cables 3, each of them is aligned with the lower open end 5' of the groove, and is then forced upward. As the cable 3 is forced upward, its outer periphery comes into engagement with the inner ridges 11, and it is thrust into the groove by outwardly forcing the wall portions 10 and 10'. When the cable 3 clears the inner ridges 11, the wall portions 10 and 10' are restored to the initial position by the elastic force to restore the initial shape of the groove 5. Thus, the cable 3 is retained in the groove 5 of the retaining portion 6 with its lower portion in engagement with the top of the inner ridges 11. A plurality of cables 3 may be mounted by repeating the operation as described above. Since the cables 3 thus inserted are retained in the groove 5 by the inner ridges 11, the cable 3 to be mounted next need to be only forced upwardly by aligning it with the lower open end 5' of the groove 5.

After the required number of cables 3 have been temporarily retained in the retaining groove 5, the arm portion 8 is turned upward to close the lower open end 5' of the groove 5 with the arm portion 8. The arm portion 8 is turned about the hinge portion 7. When the pawl 17 of the arm portion 8 is brought into contact with the outer surface of the locking means 12 of the wall portion 10', the horizontal portion 8b of the arm portion 8 is slightly displaced outwardly. When the pawl 17 clears the outer surface of the locking step 12, the horizontal portion 8b is flexed inwardly by the elastic force of the arm portion 8. The pawl 17 is thus hooked on the top of the locking step 12 to lock the arm portion 8 to the retaining portion 6. At this time, the ridge 16 of the arm portion 8 is inserted into the groove 5. Further, when the arm portion 8 is locked to the retaining portion 6, a side surface of the tongue portion 18 engages with the corresponding side surface of the vertical elongate projection 14, and also a side surface of the pawl 17 engages with the corresponding side surface 13' of the raised portion 13, so that the arm portion 8 can be regulated in its sideward movement, thus preventing wobbling or snaking of the arm portion 8 in its locked state.

To unlock the arm portion 8 from the retaining portion 6, the tongue portion 18 of the arm portion 8 is first detached from the outer surface of the wall portion 10', by using a screw driver or the like. Since the tongue portion 18 of the arm portion 8 is slightly spaced apart from the outer surface of the wall portion 10', the tip of the screw driver or the like may be easily inserted into the gap between the tongue portion 18 and the outer surface of the wall portion 10'. By subsequently pulling the tongue portion 18 from the wall portion 10', the pawl 17 of the arm portion 8 is detached from the locking step 12 of the wall portion 10', whereby the locked state is released. Now, the arm portion 8 can be turned downwards, and the cables 3 can be pulled out of the retaining groove 5.

Now, the effect of the embodiment when the cables bears a load, such as when snow or ice adhere thereto, will be described in comparison with the prior art cable holder. With the prior art cable holder having a very simple structure to facilitate the mounting, the lower opening of the retaining groove of the holder is not covered at all. Therefore, the cables are liable to be easily detached from the retaining groove when a load acts on the cables. The detached cables will sag down and may be broken by contact with the ground. In contrast, with the cable retainer 4 according to the invention, the lower open end 5' of the retaining groove 5 is closed by the arm portion 8 held locked to the retaining portion 6 by the locking means. Thus, the cables can be reliably held under the automobile body irrespective of any bad running condition.

Further, even if the arm portion 8 should be detached from the retaining portion 6, although the lower open end 5' of the retaining groove 5 retaining the cables 3 is exposed, the cables 3 can still be held in the groove 5 by the inner ridges 11. Thus, the cables 3 will not come out of the groove 5 under their own weight. Also, they will not come out even when a downward force is applied to them unless the wall portions 10 and 10' are outwardly forced apart against the elasticity thereof.

Further, even if the lowermost cable 3 should come out by clearing the inner ridges 11 due to a strong downward force, the remaining cables 3 will strike the inner ridges and be retained in the groove 5. The cable 3 detached from the retaining groove 5 is received in the receiving space 15 provided under the lower open end 5' of the groove 5 by the arm portion 8, so that it is held supported by the arm portion 8.

It is thus possible to eliminate the possibility of the cables 3 sagging considerably down from the lower surface of the mounting panel P, i.e., eliminate the possibility of contact of the cables 3 with the ground, even when the distance between the panel P and ground surface is small. Thus, it is possible to prevent the breakage of the cables due to friction thereof with the ground or occurrence of a trouble due to contact failure.

The above embodiment of the invention is described as applied to an automobile which has to run under bad weather conditions, e.g., a truck, but this is by no means limitative.

As has been described in the foregoing, according to the invention the retaining groove for retaining cables is provided at the lower open end with opposite inner ridges. Thus, even where the cable holder has to be mounted under a body in a donwardly directed state or in an obliquely downward directed state, the cables can be mounted in the retaining groove by a single operation of merely forcing the cables into the retaining groove, and there is no need for temporarily holding the cables until regular mounting. Further, in case of a cable consisting of a plurality of separate cords or wires, these cords or wires may be temporarily retained by merely inserting them one by one into the retaining groove. Further, even if the arm portion should be detached from the retaining portion, the cables can still be held retained in the retaining groove by the inner ridges thereof.

Further, since the arm portion for closing the lower open end of the retaining groove is coupled by a hinge portion to the lower end of the retaining portion and locking means for locking the arm portion at the position to close the lower open end of the retaining groove is provided between the arm portion and retaining portion, even when the vehicle is running under bad weather conditions, the cables will not be detached from the retaining groove and sag greatly from the underside of the vehicle body. Thus, it is possible to prevent damage to the cables due to detachment thereof.

What is claimed is:

1. A cable holder for laying cables along the lower surface of a panel or the like, comprising a retaining body having an upper wall and a pair of depending walls defining an axially elongated substantially U-shaped retaining groove having a lower open end for retaining cables therein, a head extending upright from the upper wall of said retaining body and being engaged in a mounting hole formed in said panel or the like, said pair of depending walls having inner stopper ridges adjacent said lower open end spaced at a distance substantially smaller than the transverse dimension of the remainder of said retaining groove for preventing the cables from escaping from said lower open end of said U-shaped groove, an arm portion united via a hinge to one of said pair of depending walls for closing the lower open end of said U-shaped groove, said hinge being positioned on said one depending wall axially outwardly of said stopped ridges in a direction away from said head so that said spacing of said stopper ridges and their resulting retention of cables inserted into said retaining groove are independent of the hinged motion of said arm portion, and locking means provided on the leading end of said arm portion and on an outer surface of the other of said pair of depending walls for locking said arm portion and the other of said of depending walls.

2. A cable holder according to claim 1, wherein said arm portion has a vertical portion and a horizontal portion, said vertical portion having a ridge of substantially trapezoidal sectional profile for insertion to close the lower open end of said retaining groove.

3. A cable holder according to claim 1, wherein said locking means consists of a locking step provided on one side half of the outer surface of the other of said pair of depending walls, a pawl portion having a substantially triangular sectional profile prdvided on a corresponding one side half of said arm portion and a tongue portion extending from the other side half of said arm portion.

4. A cable holder according to claim 3, wherein the outer surface of the other of said pair of depending walls has a vertically elongated projection formed in a substantially central upper portion thereof.

5. A cable holder according to claim 1, wherein said arm portion is provided with a receiving section facing the underside of the lower open end of said U-shaped groove, for receiving therein and retaining thereon the cables when the cables have fallen from said U-shaped groove over said inner stopper ridges by a strong force.

* * * * *